12) United States Patent
Momose et al.

(10) Patent No.: US 9,429,703 B2
(45) Date of Patent: Aug. 30, 2016

(54) ILLUMINATION APPARATUS, LIQUID-CRYSTAL DISPLAY APPARATUS, AND ELECTRONIC DEVICE

(71) Applicant: SEIKO EPSON CORPORATION, Tokyo (JP)

(72) Inventors: Yoichi Momose, Matsumoto (JP); Nobutaka Urano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/615,934

(22) Filed: Feb. 6, 2015

(65) Prior Publication Data
US 2015/0153507 A1    Jun. 4, 2015

Related U.S. Application Data

(63) Continuation of application No. 13/572,219, filed on Aug. 10, 2012, now Pat. No. 9,036,108.

(30) Foreign Application Priority Data
Aug. 17, 2011  (JP) ................. 2011-178256

(51) Int. Cl.
F21V 8/00 (2006.01)
G02F 1/1335 (2006.01)
G02F 1/1333 (2006.01)

(52) U.S. Cl.
CPC ........... G02B 6/0091 (2013.01); G02B 6/0031 (2013.01); G02B 6/0068 (2013.01); G02F 1/1336 (2013.01); G02F 2001/133317 (2013.01)

(58) Field of Classification Search
CPC .............. G02F 1/133308; G02F 1/133615; G02F 1/1336; G02F 1/133608; G02F 1/133603; G02F 1/1335; G02F 1/133504; G02F 1/133524; G02F 1/1333; G02F 2001/133314; G02F 2001/133317; G02F 2001/13332; G02F 2001/133322; G02F 2001/133354; G02F 2201/46; G02F 2201/50; G02F 2201/503; G02B 6/0088; G02B 6/0091; G02B 6/0073; G02B 6/0068; G02B 6/009; G02B 6/0055; G02B 6/0031; G02B 6/0051; G02B 6/0023; G02B 6/00; G02B 6/0021; G02B 6/0081; G02B 6/0028; G02B 6/0096

USPC .......... 349/65, 58, 62, 61, 67; 362/611, 613, 362/608, 612, 609, 610, 382, 97.1, 249.01, 362/296.01, 433, 555, 615, 622, 631, 632, 362/633, 634, 621, 617, 97.2, 97.4; 348/790, 794, 836; 257/98, 99

See application file for complete search history.

(56) References Cited

U.S. PATENT DOCUMENTS

2005/0141244 A1   6/2005 Hamada et al.
2008/0049448 A1   2/2008 Hamada et al.

(Continued)

FOREIGN PATENT DOCUMENTS

JP   2004-273185 A   9/2004
JP   2005-135860 A   5/2005

(Continued)

Primary Examiner — Thoi Duong
(74) Attorney, Agent, or Firm — Oliff PLC

(57) ABSTRACT

An illumination apparatus includes: a light-guiding plate; a plurality of light-emitting elements disposed along a side-end surface of the light-guiding plate that serves as a light-entry portion, each of the plurality of light-emitting elements has a light-emitting surface which faces toward the light entry portion; a light source substrate, disposed and separated with a space from the light entry portion of the light-guiding plate when viewed from above, that includes a mounting surface for the plurality of light-emitting elements, the mounting surface being orthogonal to the side-end surface serving as the light entry portion; and a step portion with which an end portion of the light source substrate located toward the light-guiding plate makes contact.

9 Claims, 6 Drawing Sheets

(56) References Cited

U.S. PATENT DOCUMENTS

| | | |
|---|---|---|
| 2008/0074580 A1 | 3/2008 | Chang |
| 2008/0310153 A1 | 12/2008 | Hamada et al. |
| 2009/0066877 A1 | 3/2009 | Abe et al. |
| 2009/0128732 A1 | 5/2009 | Hamada |
| 2010/0027290 A1 | 2/2010 | Hamada et al. |
| 2010/0149835 A1 | 6/2010 | Cho et al. |
| 2010/0245716 A1 | 9/2010 | Mo et al. |
| 2011/0075444 A1 | 3/2011 | Hamada et al. |
| 2012/0081925 A1* | 4/2012 | Cho .................. G02F 1/133615 362/613 |
| 2012/0087150 A1 | 4/2012 | Hamada et al. |

FOREIGN PATENT DOCUMENTS

| | | |
|---|---|---|
| JP | 2005-196989 A | 7/2005 |
| JP | 2007-207615 A | 8/2007 |
| WO | 2006-129625 A1 | 12/2006 |

* cited by examiner

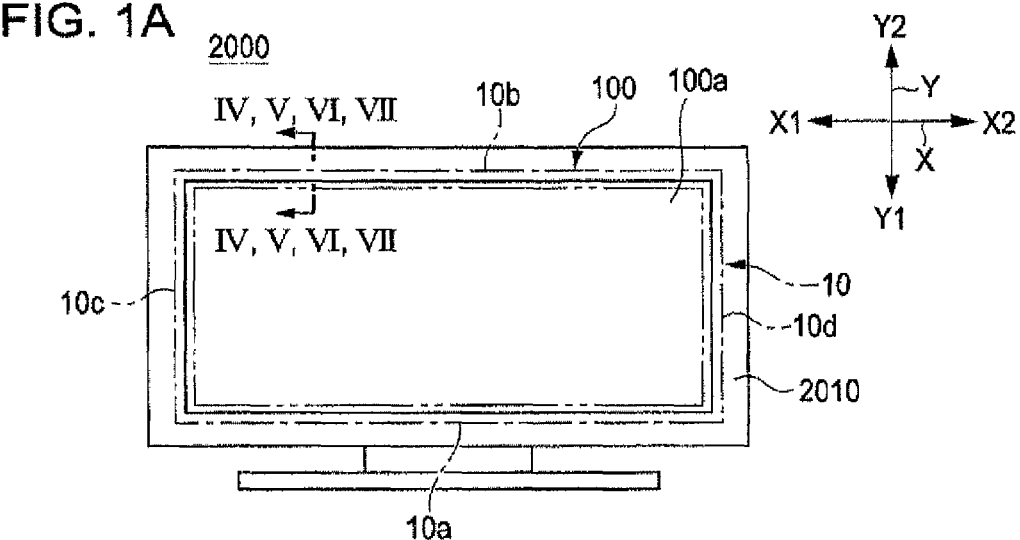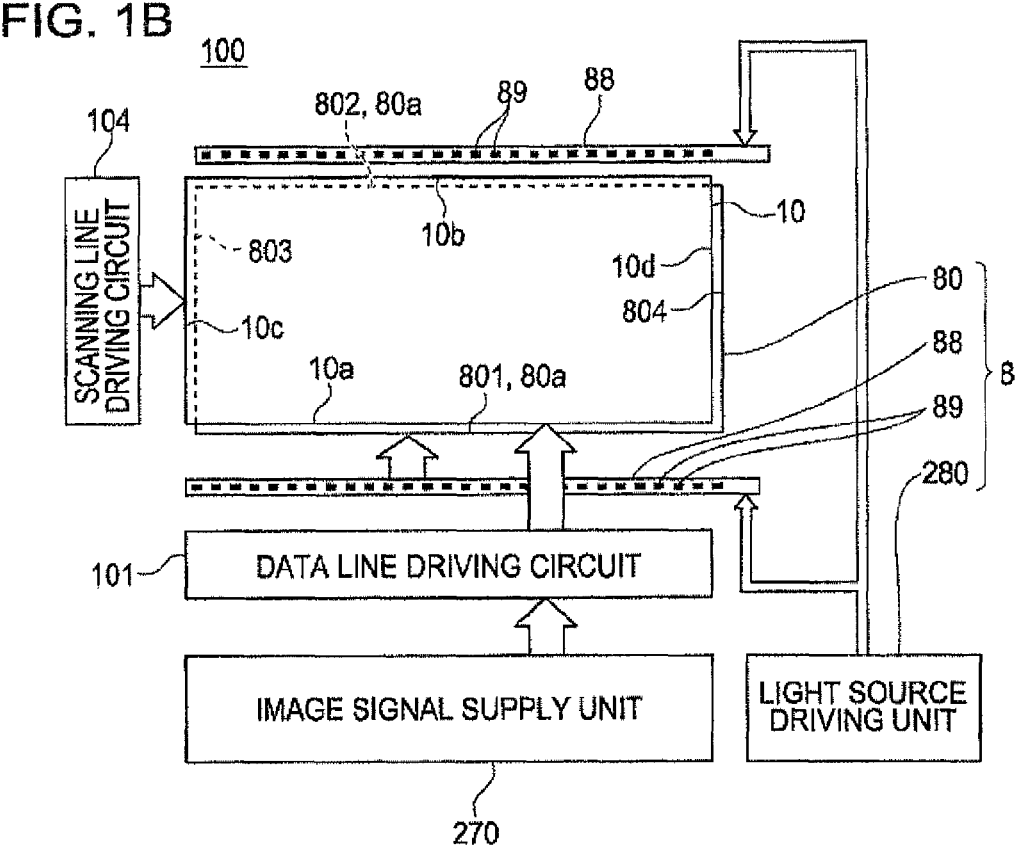

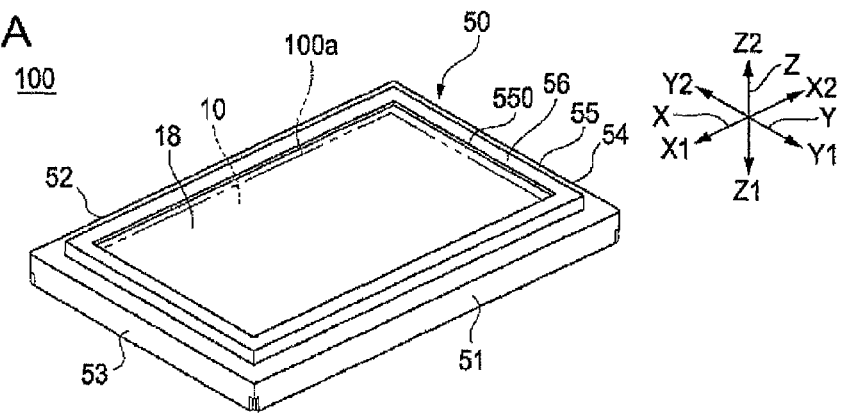
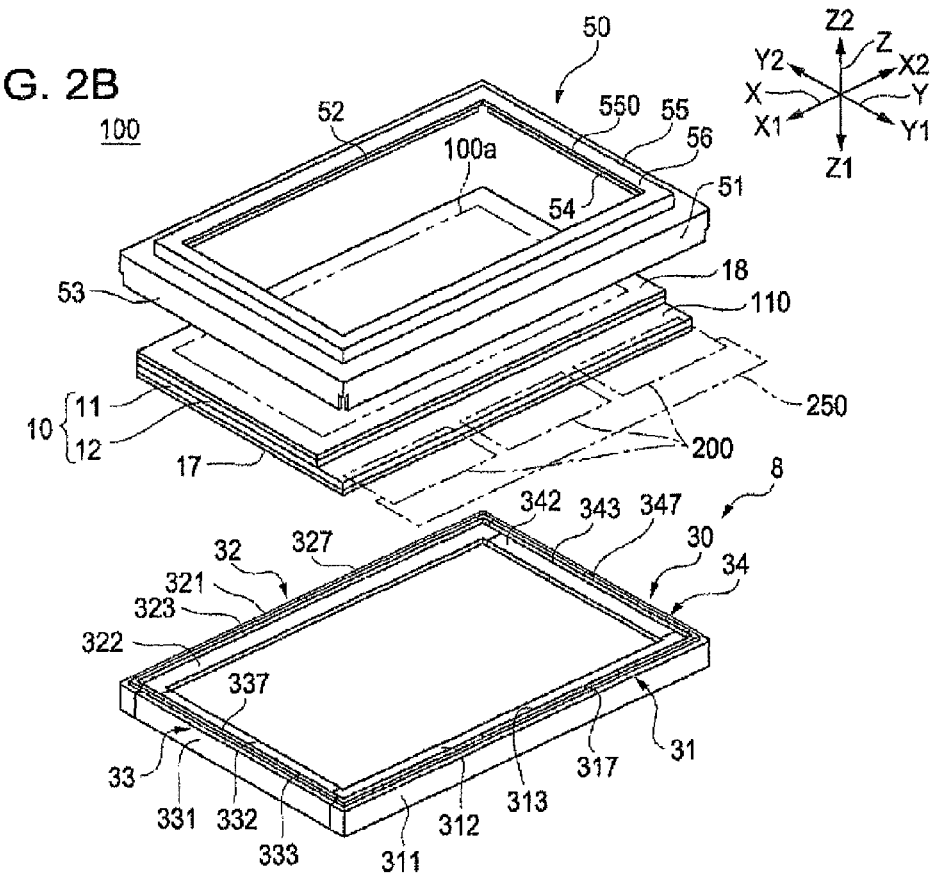

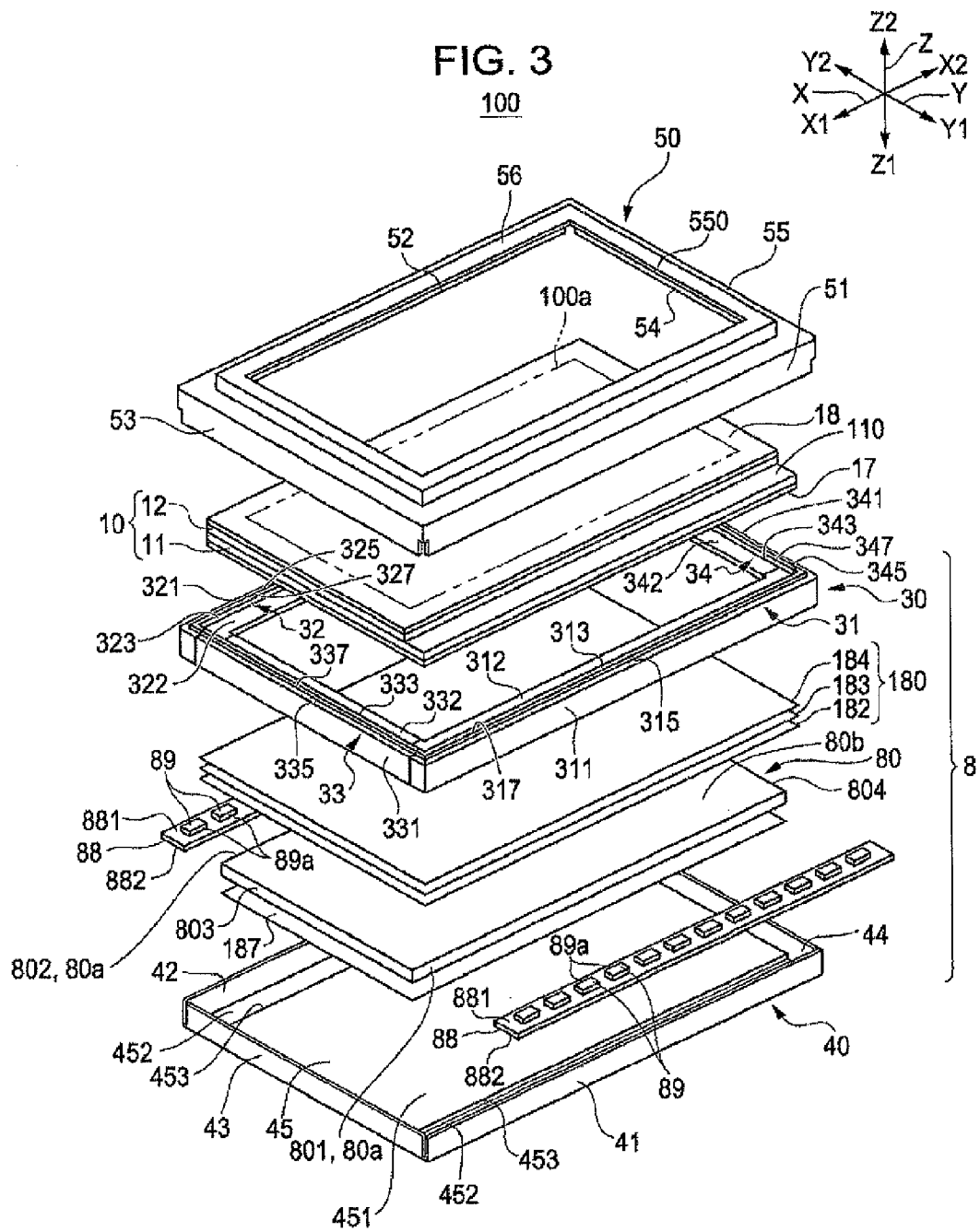

ILLUMINATION APPARATUS, LIQUID-CRYSTAL DISPLAY APPARATUS, AND ELECTRONIC DEVICE

CROSS REFERENCE TO THE RELATED APPLICATIONS

This application is a continuation application of U.S. patent application Ser. No. 13/572,219 filed Aug. 10, 2012 which claims priority to Japanese Patent Application No. 2011-178256 filed Aug. 17, 2011, the entire contents of which are incorporated herein by reference.

BACKGROUND

1. Technical Field

The present invention relates to illumination apparatuses provided with light-guiding plates and light-emitting elements, liquid-crystal display apparatuses provided with such illumination apparatuses, and electronic devices provided with such liquid-crystal display apparatuses.

2. Related Art

A liquid-crystal display apparatus provided with a transmissive type liquid-crystal panel includes, as shown in FIG. 8, an illumination apparatus 8 in which light-emitting elements 89 are disposed on a side end surface of a light-guiding plate 80 serving as a light entry portion 80a; meanwhile, optical sheets 180 and a liquid-crystal panel 10 are disposed in an overlapping manner on a light-emitting surface 80b side of the light-guiding plate 80. A light source substrate 88 provided with a mounting surface 881 orthogonal to the light entry portion 80a is used in this illumination apparatus 8, and in the case where a configuration in which the light-emitting elements 89 are mounted on the mounting surface 881 of the light source substrate 88, tilting in the optical axis of the light-emitting elements 89 causes the occurrence of illumination unevenness.

Accordingly, a configuration in which the light-guiding plate 80 and the light source substrate 88 are supported by a base plate portion 45 of a first frame 40 has been proposed (see JP-A-2004-273185).

Meanwhile, in the illumination apparatus 8 disclosed in JP-A-2004-273185, a configuration is employed in which the base plate portion 45 is recessed and a substrate support portion 456 is provided in a location that is lower than the surface of the base plate portion 45 that supports the light-guiding plate 80, and end portions of the light-guiding plate 80 partially overlap with the light source substrate 88.

However, according to the configuration illustrated in FIG. 8, at the ends of the light-guiding plate 80, there are areas where the first frame 40 overlaps with a rear surface 80c of the light-guiding plate 80 and areas where the light source substrate 88 overlaps with the rear surface 80c of the light-guiding plate 80; at these areas, the reflectance, degree of diffusion, and so on of the light differs. Accordingly, there is a problem in that illumination unevenness arises in the illumination light emitted from the light-guiding plate 80. Meanwhile, although there are cases where a reflective sheet 187 is provided on the rear surface 80c of the light-guiding plate 80, in such a case, the reflective sheet will warp due to height differences between a portion 187a of the reflective sheet 187 that makes contact with the base plate portion 45, a portion 187b of the reflective sheet 187 that overlaps with a gap, and a portion 187c of the reflective sheet 187 that makes contact with the light source substrate 88; this results in a problem in that illumination unevenness occurs.

SUMMARY

It is an advantage of some aspects of the invention to provide an illumination apparatus capable of suppressing the occurrence of illumination unevenness even in the case where a structure in which a light-guiding plate and a light source substrate are supported by a base plate portion of a frame is employed, a liquid-crystal display apparatus provided with such an illumination apparatus, and an electronic device provided with such a liquid-crystal display apparatus.

An illumination apparatus according to an aspect of the invention includes: a light-guiding plate; a plurality of light-emitting elements disposed along a side-end surface of the light-guiding plate that serves as a light-entry portion, each of the plurality of light-emitting elements has a light-emitting surface which faces toward the light entry portion; a light source substrate, disposed and separated with a space from the light entry portion of the light-guiding plate when viewed from above, that includes a mounting surface for the plurality of light-emitting elements, the mounting surface being orthogonal to the side-end surface serving as the light entry portion; and a step portion with which an end portion of the light source substrate located toward the light-guiding plate makes contact.

According to this aspect of the invention, the light-guiding plate and the light source substrate are provided, and the step portion with which an end portion of the light source substrate located toward the light-guiding plate makes contact is provided. Accordingly, the light source substrate can be positioned in a precise manner.

According to another aspect of the invention, it is preferable for the illumination apparatus to further include a light-guiding plate support portion that supports the light-guiding plate on an opposite side as a direction in which light is emitted from the light-guiding plate, in a region that overlaps with the light-guiding plate when viewed from above, and a substrate support portion that supports the light source substrate on an opposite side that serving as the mounting surface, in a region that overlaps with the light source substrate when viewed from above; and for the step portion to be provided between the light-guiding plate support portion and the substrate support portion. According to this configuration, the light-guiding plate and the light source substrate are supported in a proper attitude, and thus the light-emitting element can be disposed at a proper attitude relative to the light-guiding plate.

According to another aspect of the invention, a configuration can be employed in which the illumination apparatus further includes a frame having a base plate portion on a side of the light-guiding plate that is opposite to the direction in which the light is emitted from the light-guiding plate, and the light-guiding plate support portion, the substrate support portion, and the step portion are formed in the base plate portion of the frame.

According to another aspect of the invention, a configuration can be employed in which the illumination apparatus further includes a frame having a base plate portion on a side of the light-guiding plate that is opposite to a direction in which light is emitted from the light-guiding plate, and a light-guiding plate support portion that supports the light-guiding plate and the step portion are formed in the base plate portion of the frame in a region that overlaps with the light-guiding plate when viewed from above.

According to another aspect of the invention, a configuration may be employed in which the illumination apparatus further includes a frame having a base plate portion on a side of the light source substrate that is opposite to a direction in which light is emitted from the light-guiding plate, and a substrate support portion that supports the light source substrate and the step portion are formed in the base plate portion of the frame in a region that overlaps with the light source substrate when viewed from above.

According to another aspect of the invention, a configuration may be employed in which the illumination apparatus further includes a first frame portion having a first base plate portion on a side of the light-guiding plate that is opposite to the direction in which the light is emitted and the light-guiding plate support portion is formed in the first base plate portion of the first frame portion; a second frame portion having a second base plate portion on an opposite side of the mounting surface of the light source substrate, and the substrate support portion is formed in the second base plate portion of the second frame portion.

In this case, it is preferable for the first base plate portion in the first frame portion in which the light-guiding plate support portion is formed and the second base plate portion in the second frame portion in which the substrate support portion is formed to partially overlap with each other when viewed from above. According to this configuration, there is an advantage in that the precision with which the two frames are positioned in a direction in which the light is emitted is high.

According to another aspect of the invention, it is preferable for the substrate support portion to be recessed in an opposite direction as the direction in which the light is emitted when viewed from the light-guiding plate support portion. According to this configuration, a position of the light-emitting element in the thickness direction of the light-guiding plate can be optimized.

According to another aspect of the invention, it is preferable for an end portion of each of the plurality of the light-emitting elements on an opposite side as the light source substrate to be positioned lower than a light emission surface of the light-guiding plate. According to this configuration, the illumination apparatus can be made thinner.

According to another aspect of the invention, a configuration may be employed in which a depth dimension of the step portion is equal to a thickness dimension of the light source substrate.

According to another aspect of the invention, a depth dimension of the step portion may be smaller than a thickness dimension of the light source substrate. According to this configuration, the light-emitting element can be provided in a position that is higher by that amount, and thus a height of the light-emitting element can be matched to the light-guiding plate.

According to another aspect of the invention, it is preferable for the light-emitting surface of each of the plurality of the light-emitting elements to be located closer toward the light-guiding plate than the end portion of the light source substrate that is located toward the light-guiding plate. According to this configuration, a distance between the light entry portion and the light-emitting element can be set to be smaller than a distance between the light entry portion and the light source substrate.

According to another aspect of the invention, it is preferable for the frame provided with the substrate support portion to have a side plate portion erected from the base plate portion on an opposite side of the substrate support portion as the light-guiding plate, and for an end portion of the light source substrate on an opposite side as the light-guiding plate to make contact with the side plate portion. According to this configuration, a configuration in which the light source substrate is sandwiched between the step portion and the side plate portion can be employed, and thus the light source substrate can be anchored with certainty.

An illumination apparatus in which the invention is applied can be used in a liquid-crystal display apparatus, and such a liquid-crystal display apparatus includes a liquid-crystal panel disposed overlapping a light-emitting surface side of the light-guiding plate.

The liquid-crystal display apparatus according to the invention may be used in an electronic device such as an LCD television.

BRIEF DESCRIPTION OF THE DRAWINGS

The invention will be described with reference to the accompanying drawings, wherein like numbers reference like elements.

FIGS. 1A and 1B are schematic diagrams illustrating an LCD television (electronic device) provided with a liquid-crystal display apparatus according to a first embodiment of the invention.

FIGS. 2A and 2B are schematic diagrams illustrating the overall configuration of a liquid-crystal display apparatus according to the first embodiment of the invention.

FIG. 3 is an exploded perspective view showing the liquid-crystal display apparatus according to the first embodiment of the invention on a more detailed level.

DESCRIPTION OF EXEMPLARY EMBODIMENTS

Figure 8:
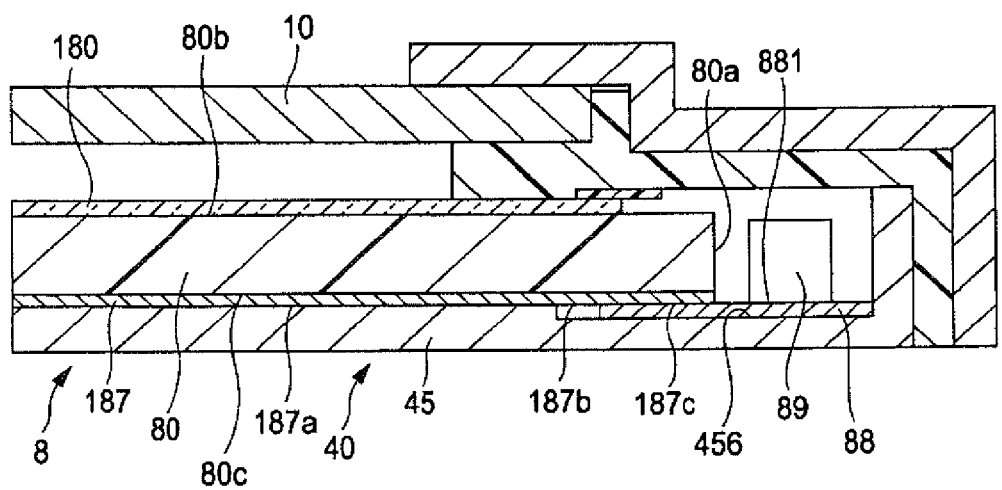
FIG. 8 is a schematic diagram illustrating a past liquid-crystal display apparatus.

Embodiments in which the invention has been applied in a liquid-crystal display apparatus for a LCD television will be described hereinafter with reference to the drawings. Note that in the drawings referred to in the following descriptions, the dimensions of various layers, members, and so on have been varied in order to illustrate those layers, members, and so on at sizes that can be viewed more easily. Furthermore, in the following descriptions, in order to facilitate understanding of the correspondence with the configuration described with reference to FIG. 8, corresponding constituent elements will be assigned the same reference numerals.

It should also be noted that in the following descriptions, one of the planar directions of a light-guiding plate, a liquid-crystal panel, and so on that are orthogonal to each other is taken as the X-axis direction (the direction along which the long side of the light-guiding plate, the liquid-crystal panel, or the like (a display panel) extends in the drawings) and the other is taken as the Y-axis direction (the direction along which the short side of the light-guiding plate, the liquid-crystal panel, or the like extends in the drawings); and the direction that is orthogonal to both the X-axis direction and the Y-axis direction (the direction along which the light-guiding plate and the liquid-crystal panel are layered in the drawings) is taken as the Z-axis direction. Furthermore, in the drawings referred to hereinafter, one side of the X-axis direction is taken as an X1 side, and the other side is taken as an X2 side; one side of the Y-axis direction (the direction in which an overhang portion of the liquid-crystal panel is disposed) is taken as a Y1 side, and the other direction opposed thereto is taken as a Y2 side; and one side of the Z-axis direction (the direction facing the rear surface of the light-guiding plate) is taken as a Z1 side (a bottom side), and the other direction opposed thereto (the side toward which illumination light, display light, and so on are emitted/a direction in which light is emitted) is taken as a Z2 side (a top side).

First Embodiment

Overall Configuration

FIGS. 1A and 1B are schematic diagrams illustrating an LCD television (electronic device) provided with a liquid-crystal display apparatus according to a first embodiment of the invention, where FIG. 1A is a schematic diagram illustrating the LCD television from the exterior thereof, and FIG. 1B is a block diagram illustrating the electrical configuration of the liquid-crystal display apparatus.

An electronic device 2000 shown in FIG. 1A is an LCD television, and includes a liquid-crystal display apparatus 100, a television frame 2010, and so on. The liquid-crystal display apparatus 100 includes the liquid-crystal panel 10 (a display panel) that will be described later, an image signal supply unit 270 that supplies image signals to the liquid-crystal panel 10, and the illumination apparatus 8 that supplies illumination light to the liquid-crystal panel 10. In addition, the liquid-crystal display apparatus 100 includes a scanning line driving circuit 104 that drives scanning lines extending in the liquid-crystal panel 10 in the X-axis direction thereof, and a data line driving circuit 101 that drives data lines extending in the liquid-crystal panel 10 in the Y-axis direction thereof. A configuration in which the scanning line driving circuit 104 and the data line driving circuit 101 are both installed in the liquid-crystal panel 10 can be employed. Alternatively, a configuration in which one of the scanning line driving circuit 104 and the data line driving circuit 101 is installed in the liquid-crystal panel 10 and the other is installed in a COG-mounted driving IC in the liquid-crystal panel 10 can be employed. Furthermore, a configuration in which one of the scanning line driving circuit 104 and the data line driving circuit 101 is installed in the liquid-crystal panel 10 and the other is installed in a driving IC mounted on a circuit board that is electrically connected to the liquid-crystal panel 10 can be employed. Further still, a configuration in which both the scanning line driving circuit 104 and the data line driving circuit 101 are installed in a driving IC that is separate from the liquid-crystal panel 10 can be employed.

In this embodiment, the illumination apparatus 8 includes: a light-guiding plate 80 disposed so as to overlap with the liquid-crystal panel 10; a plurality of light-emitting elements 89 disposed along side-end surfaces of the light-guiding plate 80 that are assigned as light-entry portions 80a; light source substrates 88 on which the plurality of light-emitting elements 89 are mounted; and a light source driving unit 280 that drives the light-emitting elements 89. In this embodiment, the liquid-crystal panel 10 is a laterally-long quadrangle having four sides 10a, 10b, 10c, and 10d. Of the sides 10a, 10b, 10c, and 10d, the side 10a is a long side located on the one side Y1 in the Y-axis direction, the side 10b is a long side located on the other side Y2 in the Y-axis direction, the side 10c is a short side located on the one side X1 in the x-axis direction, and the side 10d is a short side located on the other side X2 in the X-axis direction. In correspondence with this shape, the light-guiding plate 80 has four side-end surfaces 801, 802, 803, and 804. Of these side-end surfaces 801 through 804, the side-end surface 801 is located on the long side corresponding to the one side Y1 in the Y-axis direction, the side-end surface 802 is located on the long side corresponding to the other side Y2 in the Y-axis direction, the side-end surface 803 is located on the short side corresponding to the one side X1 in the X-axis direction, and the side-end surface 804 is located on the short side corresponding to the other side X2 in the X-axis direction. In this embodiment, of the four side-end surfaces 801, 802, 803, and 804 of the light-guiding plate 80, the two side-end surfaces 801 and 802 that are opposed in the short side direction (the Y-axis direction) serve as the light-entry portions 80a. Accordingly, the light-emitting elements 89 are disposed along each of the two side-end surfaces 801 and 802 (the light-entry portions 80a) in the light-guiding plate 80, and the light source substrates 88 extend along the respective side-end surfaces 801 and 802 (light-entry portions 80a) in the light-guiding plate 80.

Detailed Configuration of Liquid-Crystal Display Apparatus 100

Figure 4:
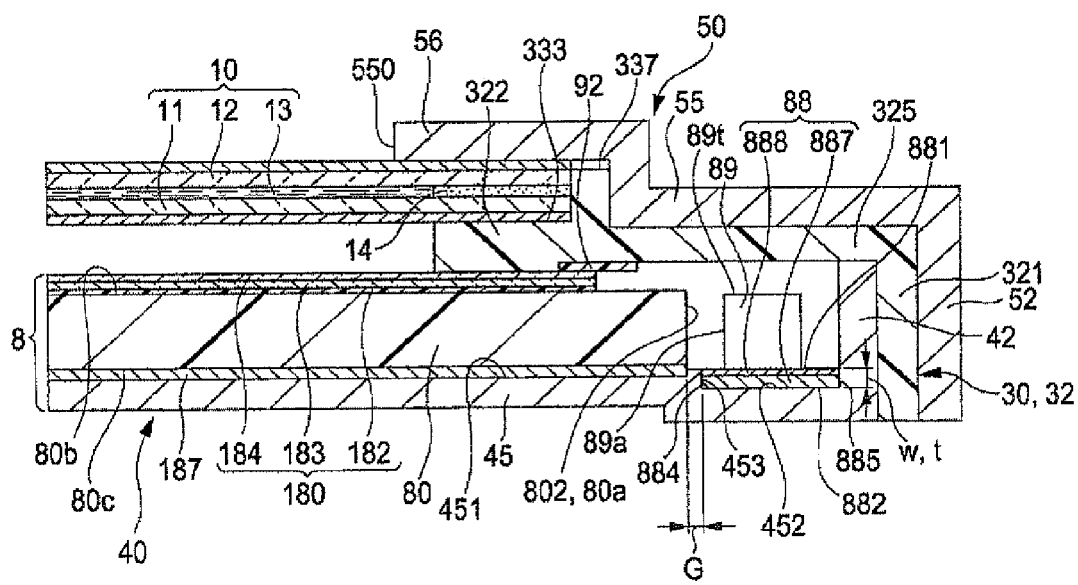
FIG. 4 is a cross-sectional view showing the liquid-crystal display apparatus according to the first embodiment of the invention along the IV-IV line in FIG. 1A.

FIGS. 2A and 2B are schematic diagrams illustrating the overall configuration of the liquid-crystal display apparatus 100 according to the first embodiment of the invention, and are a perspective view and an exploded perspective view, respectively, of the liquid-crystal display apparatus 100. FIG. 3 is an exploded perspective view showing the liquid-crystal display apparatus 100 according to the first embodiment of the invention on a more detailed level. FIG. 4 is a cross-sectional view showing the liquid-crystal display apparatus 100 according to the first embodiment of the invention along the IV-IV line in FIG. 1A.

In FIGS. 2A, 2B, 3, and 4, the liquid-crystal display apparatus 100 according to this embodiment is, generally speaking, configured of the illumination apparatus 8, which is referred to as a backlight apparatus, and the transmissive type liquid-crystal panel 10, which is disposed so as to overlap with the top surface of the illumination apparatus 8. In the liquid-crystal display apparatus 100, the illumination apparatus 8 includes: a metallic first frame 40 (lower metal frame) disposed so as to cover the rear surface of the light-guiding plate 80 on the bottom side (one side Z1 in the Z-axis direction); a resinous second frame 30 (resin frame) that holds the ends of the liquid-crystal panel 10 above the first frame 40 and surrounds and holds the illumination apparatus 8; and a metallic third frame 50 (upper metal frame) disposed on the top side (another side Z2 in the Z-axis direction) of the second frame 30.

The second frame 30 has a rectangular frame shape that holds the ends of the liquid-crystal panel 10 and surrounds the outside of the liquid-crystal panel 10, and in this embodiment, the second frame 30 is configured of four frame plates 31, 32, 33, and 34 that are divided into four side sections corresponding to the four sides of the liquid-crystal panel 10. In this embodiment, the second frame 30 is black, and prevents the occurrence of stray light within the illumination apparatus 8 by functioning as a light absorption member.

The frame plates 31, 32, 33, and 34 respectively include: side plate portions 311, 321, 331, and 341 that extend downward from the outer surface sides of the frame plates 31, 32, 33, and 34; upper plate portions 315, 325, 335, and 345 (end plate portions) that are bent inward from the upper edges of the side plate portions 311, 321, 331, and 341, respectively; and overhang portions 312, 322, 332, and 342 that protrude further inward from the upper plate portions 315, 325, 335, and 345, respectively. Meanwhile, protrusions 317, 327, 337, and 347 that protrude upward are formed in the upper plate portions 315, 325, 335, and 345, respectively. Accordingly, step portions 313, 323, 333, and 343 are formed in the frame plates 31, 32, 33, and 34, respectively, by the overhang portions 312, 322, 332, and 342 and the protrusions 317, 327, 337, and 347, and the liquid-crystal panel 10 is positioned by the step portions 313, 323, 333, and 343 and the overhang portions 312, 322, 332, and 342. Meanwhile, the light-guiding plate 80 and so on of the illumination apparatus 8 are disposed on the bottom side of the overhang portions 312, 322, 332, and 342.

The first frame 40 is formed through press-machining a thin metal plate such as SUS or the like. The first frame 40 includes a base plate portion 45 and four side plate portions 41, 42, 43, and 44 erected from the outer edges of the base plate portion 45, and the upper surface of the first frame 40 thus forms a rectangular box shape whose top surface is open. The side plate portions 311, 321, 331, and 341 of the second frame 30 overlap on the outside of the side plate portions 41, 42, 43, and 44, respectively, of the first frame 40.

The third frame 50 is, like the first frame 40, formed through press-machining a thin metal plate such as SUS or the like. The third frame 50 includes a rectangular upper plate portion 55 (end plate portion) and four side plate portions 51, 52, 53, and 54 formed by bending the outer edges of the upper plate portion 55 downward, and has a rectangular box-shape whose bottom surface is open. The side plate portions 51, 52, 53, and 54 overlap on the outside of the side plate portions 311, 321, 331, and 341, respectively, of the second frame 30. A step portion 56 is formed in the upper plate portion 55, and a rectangular window 550 that emits light emitted from the liquid-crystal panel 10 is formed in the step portion 56. In the third frame 50, the upper plate portion 55 covers the second frame 30, and the step portion 56 covers the entirety of the outer circumferential ends of the sides of the liquid-crystal panel 10 from which display light is emitted.

The third frame 50, second frame 30, and first frame 40 configured in this manner are connected using screws (not shown), and the liquid-crystal panel 10, illumination apparatus 8, and so on are held therein as a result. To be more specific, the ends of the liquid-crystal panel 10 are sandwiched between the overhang portions 312, 322, 332, and 342 of the second frame 30 and the step portion 56 of the third frame 50. In addition, the ends of a reflective sheet 187, the light-guiding plate 80, and optical sheets 180 (a diffusion sheet 182, prism sheets 183 and 184) are sandwiched between the overhang portions 312, 322, 332, and 342 of the second frame 30 and the base plate portion 45 of the first frame 40. Accordingly, the ends of the optical sheets 180 are sandwiched between the overhang portions 312, 322, 332, and 342 of the second frame 30 and the light-guiding plate 80. Here, a flexible sheet 92 is affixed to the bottom surface of the overhang portions 312, 322, 332, and 342 of the second frame 30. Accordingly, when the liquid-crystal display apparatus 100 is assembled, the illumination apparatus 8 is supported via the flexible sheet 92. Furthermore, when the liquid-crystal display apparatus 100 is assembled, an optical sheet of the illumination apparatus 8 (the diffusion sheet 182, prism sheets 183 and 184, and so on) is pressed and held so as not experiencing lifting, positional skew, and so on by the flexible sheet 92.

Configuration of Liquid-Crystal Panel 10

As shown in FIGS. 2A, 2B, 3, and 4, the liquid-crystal panel 10 includes: an element substrate 11 having a planar quadrangular shape and in which pixel electrodes (not shown) and the like are formed; an opposing substrate 12 disposed opposite to the element substrate 11 with a predetermined gap provided therebetween; and a rectangular frame-shaped sealant 14 that affixes the opposing substrate 12 and the element substrate 11 to each other. In the liquid-crystal panel 10, a liquid-crystal layer 13 is held within a region surrounded by the sealant 14. The element substrate 11 and the opposing substrate 12 are configured of light-transmissive substrates such as glass substrates. In the element substrate 11, a plurality of scanning lines (not shown) extend along the X-axis direction, whereas a plurality of data lines extend along the Y-axis direction; switching elements (not shown) and pixel electrodes are provided corresponding to each location where the scanning lines and data lines intersect (not shown).

In this embodiment, the opposing substrate 12 is disposed on the side toward which display light is emitted, and the element substrate 11 is disposed on the side of the illumination apparatus 8. Meanwhile, a frame-shaped layer (not shown) configured of a rectangular frame-shaped light-blocking layer is formed on the surface of the opposing substrate 12 that is opposed to the element substrate 11 so as to follow the inner edges of the four sides of the sealant 14, and the region defined by the inner edges of the frame-shaped layer corresponds to an image display region 100a. Note that the inner edges of the upper plate portion 55 of the third frame 50 are located in a position partway along the width direction of the frame-shaped layer, and the window 550 of the third frame 50 overlaps with a portion of the inner circumference of the image display region 100a and the frame-shaped layer.

The liquid-crystal panel 10 is configured of a TN (twisted nematic), ECB (electrically-controlled birefringence), or VAN (vertical aligned nematic) liquid-crystal panel; the pixel electrodes are formed in the element substrate 11, and a common electrode (not shown) is formed in the opposing substrate 12. Note that in the case where the liquid-crystal panel 10 is an IPS (in-plane switching) or FES (fringe field switching) liquid-crystal panel, the common electrode is provided in the element substrate 11. The element substrate 11 may also be disposed on the side of the opposing substrate 12 toward which the display light is emitted. An upper polarization plate 18 is disposed overlapping the upper surface of the liquid-crystal panel 10, and a lower polarization plate 17 is disposed between the lower surface of the liquid-crystal panel 10 and the illumination apparatus 8.

In this embodiment, the element substrate 11 is larger than the opposing substrate 12. Accordingly, the element substrate 11 includes an overhang portion 110 that extends past the end portion of the opposing substrate 12 on the one side Y1 in the Y-axis direction, and a plurality of flexible wiring boards 200 are connected to the top surface of the overhang portion 110. The flexible wiring boards 200 are connected to a circuit board 250 configured of a rigid board, and a control IC (not shown) that configures the image signal supply unit 270 described with reference to FIGS. 1A and 1B, a light source driving IC (not shown) that configures the light source driving unit 280, and so on are mounted on the circuit board 250.

The illumination apparatus 8 includes: the light-guiding plate 80 disposed so as to overlap with the bottom surface of the liquid-crystal panel 10; and the plurality of light-emitting elements 89 arranged from one end of the light-entry portions 80*a* (the one side X1 in the X-axis direction) toward the other end (the other side X2 in the X-axis direction) with their light-emitting surfaces 89*a* facing toward the light-entry portions 80*a* of the light-guiding plate 80. In this embodiment, the plurality of light-emitting elements 89 are mounted on a mounting surface 881 of the light source substrate 88 that extends in the x-axis direction following the light-entry portions 80*a*. The light-emitting elements 89 are LEDs (light-emitting diodes) that emit white light, and emit light source light as divergent light.

In the illumination apparatus 8 according to this embodiment, of the side-end surfaces 801, 802, 803, and 804 of the light-guiding plate 80, the two side-end surfaces 801 and 802 opposite to each other in the Y-axis direction are used as the light-entry portions 80*a*. For this reason, the plurality of light-emitting elements 89 have their light-emitting surfaces 89*a* pointed toward the two light-entry portions 80*a* (the side-end surfaces 801 and 802) of the light-guiding plate 80, and are arranged from one end toward the other end of each of the two light-entry portions 80*a* (the side-end surfaces 801 and 602). Meanwhile, two light source substrates 88 are disposed extending along the two light-entry portions 80*a* (the side-end surfaces 801 and 802), respectively, and the plurality of light-emitting elements 89 are mounted on the respective mounting surfaces 881 of the two light source substrates 88.

In this embodiment, the light-guiding plate 80 is a light-transmissive resin plate configured of an acrylic resin, a polymethylstyrene resin, a polycarbonate resin, or the like, and is disposed between a rear surface 80*c* of the light-guiding plate 80 (the surface on the opposite side/the opposite surface as the light-emitting surface 80*b*) and the base plate portion 45 of the first frame 40 with a reflective sheet 187 overlapping thereupon. The resin plate used for the light-guiding plate 80 is formed through extrusion molding, injection molding, or the like.

Meanwhile, the optical sheets 180 such as the diffusion sheet 182, the prism sheets 183 and 184, or the like are disposed in an overlapping manner between a top surface (the light-emitting surface 80*b*) of the light-guiding plate 80 and the liquid-crystal panel 10. The diffusion sheet 182 is configured of a sheet in which a light-transmissive resin such as acrylic resin, polycarbonate resin, or the like and silica particles or the like have been dispersed in a coating layer. In this embodiment, the two prism sheets 183 and 184 are disposed so that their respective ridgelines are orthogonal to each other. Accordingly, illumination light emitted from the light-emitting surface 80*b* of the light-guiding plate 80 is diffused in all directions by the diffusion sheet 182, and is then imparted with directionality by the two prism sheets 183 and 184 so as to have a peak in the forward direction of the liquid-crystal panel 10.

In the light-guiding plate 80, a plurality of groups of linear fine recesses that extend in the X-axis direction are formed as a scattering pattern in the rear surface 80*c* on which the reflective sheet 187 is located. In this embodiment, the group density is greater as the distance from the light-emitting elements 89 increases. Accordingly, the intensity distribution of the illumination light emitted from the light-guiding plate 80 is made uniform regardless of the distance from the light-emitting elements 89.

In this embodiment, the light source substrates 88 are disposed so that the mounting surfaces 881 on which the light-emitting elements 89 are mounted are orthogonal to the light-entry portions 80*a* of the light-guiding plate 80. Accordingly, the emission optical axes of the light-emitting surfaces 89*a* of the light-emitting elements 89 are oriented in a direction parallel to the mounting surface 881.

Here, the light source substrates 88 are structured so that a wiring pattern, lands, and so on are provided along with an insulating layer on the mounting surfaces 881 side of plate-shaped metallic plates 887 (support plates) that extend along the light-entry portions 80*a*. This configuration can be realized by affixing, to the mounting surfaces 881 side of the metallic plates 887, a flexible wiring board 888 in which a resin base layer, a wiring pattern, and an insulating protective layer or the like are stacked in that order. Accordingly, the lands on which the wiring pattern and the chips for the light-emitting elements 89 are mounted are electrically insulated from the metallic plates 887. In this embodiment, the metallic plates 887 are configured of aluminum plates, and the metallic plates 887 ensure the mechanical strength of the light source substrates 88 and also function as heat dissipation plates that dissipate the heat from the light-emitting elements 89.

Configuration of Base Plate Portion 45, etc. of First Frame 40

Next, the configuration of the base plate portion 45 of the first frame 40 on the side on which the side-end surface 802 of the light-guiding plate 80 is located, a structure for anchoring the light source substrate 88, and so on will be described with reference primarily to FIG. 4. Although the light-emitting elements 89, light source substrate 88, and so on are also provided on the side-end surface 801 of the light-guiding plate 80 in this embodiment, the side-end surface 801 has essentially the same configuration as the side-end surface 802, and thus the configuration of the side-end surface 801 will not be described in this embodiment.

As shown in FIG. 4, in the liquid-crystal display apparatus 100 and the illumination apparatus 8 according to this embodiment, the light source substrate 88 is disposed in a position that is adjacent to the side-end surface 802 (the light entry portion 80*a*) of the light-guiding plate 80 when viewed from above, and the mounting surface 881 on which the light-emitting elements 89 are mounted is orthogonal to the side-end surface 802 (the light entry portion 80*a*). Here, the light-emitting surfaces 89*a* of the light-emitting elements 89 are in positions that are further from the light-guiding plate 80 than an end portion 884 of the light source substrate 88 located toward the light-guiding plate 80.

In providing the light source substrate 88 on the base plate portion 45 of the first frame 40, in this embodiment, a light-guiding plate support portion 451 that supports the light-guiding plate 80 at a region that overlaps with the light-guiding plate 80 when viewed from above and a substrate support portion 452 that is recessed downward more than the light-guiding plate support portion 451 (on the opposite side as the side on which the light-emitting elements 89 are located) and supports the light source substrate 88 are provided in the base plate portion 45.

In this embodiment, an inner base portion of the substrate support portion 452 forms a plateau surface, and the metallic plate 887 that configures a rear surface 882 of the light source substrate 88 overlaps with the inner base portion of the substrate support portion 452 while making surface contact therewith. Accordingly, heat produced by the light-emitting elements 89 can efficiently escape via the metallic plate 887 of the light source substrate 88 and the base plate portion 45 of the first frame 40.

In this embodiment, a depth dimension w of the substrate support portion 452 is equal to a thickness dimension t of the light source substrate 88. Accordingly, the light-guiding plate support portion 451 and the mounting surface 881 of the light source substrate 88 are located at the same or approximately the same height. Therefore, upper end portions 89t of the light-emitting elements 89 (that is, the end portions on the opposite side of the light-emitting elements 89 as the light source substrate 88) are in lower positions than the light-emitting surface 80b of the light-guiding plate 80, and do not protrude above the light-emitting surface 80b of the light-guiding plate 80.

Here, the light-guiding plate support portion 451 and the substrate support portion 452 are separated by a predetermined distance G when viewed from above, and the light-guiding plate 80 and the light source substrate 88 do not overlap at all when viewed from above. In addition, in this embodiment, the reflective sheet 187 is provided between the light-guiding plate 80 and the light-guiding plate support portion 451, and because the reflective sheet 187 is provided in a location that overlaps with the light-guiding plate 80, the reflective sheet 187 does not overlap with the light source substrate 88 at all when viewed from above. Note that in this embodiment, the light-guiding plate support portion 451 is formed as a shallow recess, and the portion between the light-guiding plate support portion 451 and the substrate support portion 452 forms a protrusion that protrudes slightly beyond the light-guiding plate support portion 451.

In addition, in this embodiment, a step portion 453 is formed, in the base plate portion 45 of the first frame 40 and between the substrate support portion 452 and the light-guiding plate support portion 451, by the end portion of the substrate support portion 452 located toward the light-guiding plate support portion 451; in this embodiment, the end portion 884 of the light source substrate 88 located toward the light-guiding plate 80 makes contact with the step portion 453. Accordingly, the position of the light source substrate 88, or in other words, the position of the light-emitting elements 89, is regulated by the step portion 453. In addition, in the first frame 40, the side plate portion 42 is erected from the base plate portion 45 on the side of the substrate support portion 452 opposite to the light-guiding plate support portion 451, and an end portion 885 of the light source substrate 88 that is on the opposite side as the light-guiding plate 80 makes contact with the side plate portion 42. The light source substrate 88 disposed in this manner is, for example, anchored to the base of the substrate support portion 452 using screws or the like. Meanwhile, the light source substrate 88 may be anchored to the side plate portion 42, or to a portion of the base plate portion 45 located between the substrate support portion 452 and the light-guiding plate support portion 451, using an adhesive or the like.

Main Effects of this Embodiment

As described above, with the liquid-crystal display apparatus 100 and the illumination apparatus 8 according to this embodiment, both the light-guiding plate 80 and the light source substrate 88 are supported by the base plate portion 45 of the first frame 40, and thus the light-emitting elements 89 can be disposed in a proper attitude relative to the light-guiding plate 80.

In addition, the light source substrate 88 is provided in the substrate support portion 452 in which the base plate portion 45 of the first frame 40 is recessed, and the end portion 884 of the light source substrate 88 located toward the light-guiding plate 80 makes contact with the step portion 453 of the substrate support portion 452. Accordingly, the light source substrate 88 can be positioned in a precise manner, and thus the light source substrate 88 is always disposed in a position adjacent to the light entry portion 80a of the light-guiding plate 80 when viewed from above, and does not overlap with the light-guiding plate 80. For this reason, the reflectivity, diffusion, and so on is the same across the entirety of the rear surface 80c of the light-guiding plate 80, and thus it is difficult for illumination unevenness to occur. Furthermore, in the this embodiment, the reflective sheet 187 is provided on the rear surface 80c of the light-guiding plate 80, but because the reflective sheet 187 does not overlap with the light source substrate 88, the reflective sheet 187 does not warp or the like due to the light source substrate 88. Accordingly, it is difficult for illumination unevenness to occur due to warping in the reflective sheet 187.

In addition, because the light source substrate 88 is provided on the substrate support portion 452 in which the base plate portion 45 of the first frame 40 is recessed, the depth dimension w of the substrate support portion 452 is optimized, which makes it possible to match the height of the light-emitting elements 89 with the light-guiding plate 80. Furthermore, because the light source substrate 88 is provided in the substrate support portion 452 in which the base plate portion 45 of the first frame 40 is recessed, the upper end portions 89t of the light-emitting elements 89 (that is, the end portions of the light-emitting elements 89 on the opposite side as the light source substrate 88) are located lower than the light-emitting surface 80b of the light-guiding plate 80, and thus do not protrude above the light-emitting surface 80b of the light-guiding plate 80. Accordingly, the illumination apparatus 8 can be made thinner.

In addition, because the light source substrate 88 is sandwiched between the step portion 453 and the side plate portion 42, the light source substrate 88 can be anchored with certainty in a predetermined position.

Second Embodiment

Figure 5:
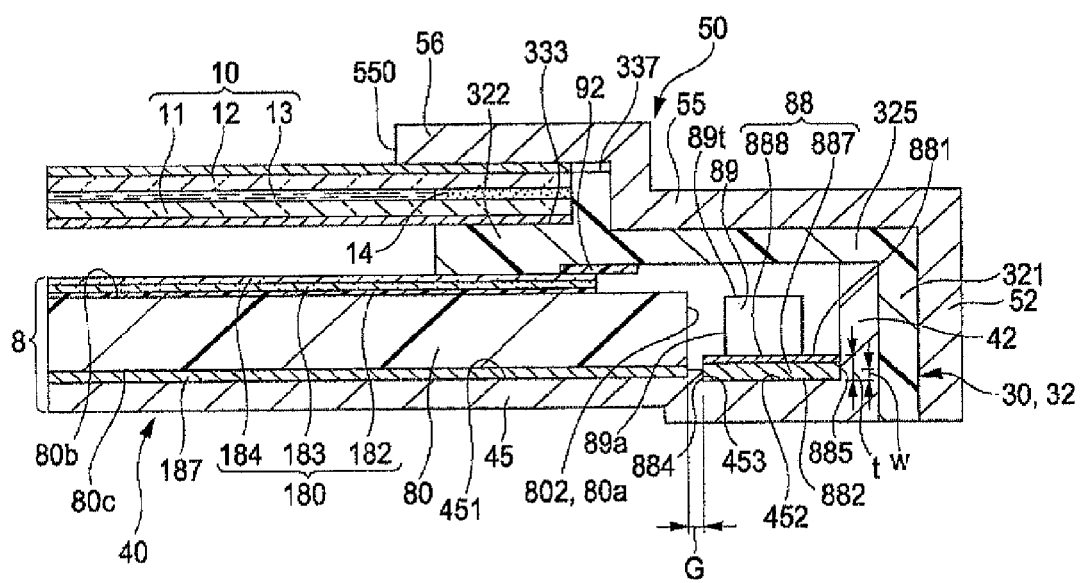
FIG. 5 is a cross-sectional view showing a liquid-crystal display apparatus according to a second embodiment of the invention along the V-V line in FIG. 1A.

FIG. 5 is a cross-sectional view showing a liquid-crystal display apparatus 100 according to a second embodiment of the invention along the V-V line in FIG. 1A. Note that the basic configuration in this embodiment is the same as that in the first embodiment, and thus corresponding constituent elements will be given the same reference numerals, and descriptions thereof will be omitted.

Although the first embodiment employs a configuration in which the depth dimension w of the substrate support portion 452 is equal to the thickness dimension t of the light source substrate 88, in this embodiment, the depth dimension w of the substrate support portion 452 is smaller than the thickness dimension t of the light source substrate 88, as shown in FIG. 5. Accordingly, the mounting surface 881 of the light source substrate 88 is in a higher position than the light-guiding plate support portion 451. Accordingly, the light-emitting elements 89 can be provided in a higher position than in the first embodiment and so on, and thus the height of the light-emitting elements 89 can be matched to the light-guiding plate 80.

Even in this case, according to this embodiment, the upper end portions 89*t* of the light-emitting elements 89 (that is, the end portions on the opposite side of the light source substrate 88 of the light-emitting elements 89) are in lower positions than the light-emitting surface 80*b* of the light-guiding plate 80, and do not protrude above the light-emitting surface 80*b* of the light-guiding plate 80. Accordingly, the illumination apparatus 8 can be made thinner.

Third Embodiment

Figure 6:
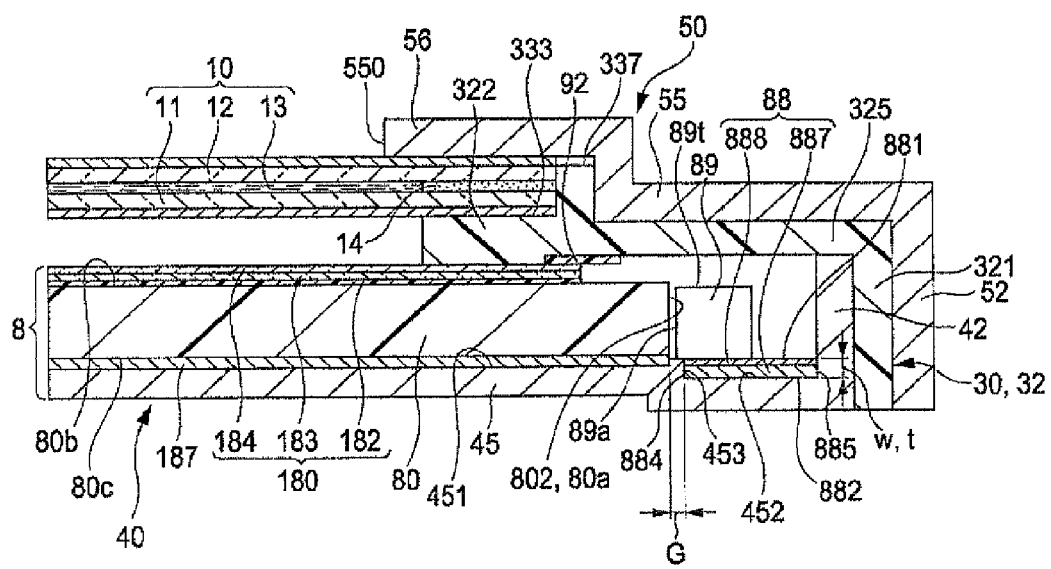
FIG. 6 is a cross-sectional view showing a liquid-crystal display apparatus according to a third embodiment of the invention along the VI-VI line in FIG. 1A.

FIG. 6 is a cross-sectional view showing a liquid-crystal display apparatus 100 according to a third embodiment of the invention along the VI-VI line in FIG. 1A. Note that the basic configuration in this embodiment is the same as that in the first embodiment, and thus corresponding constituent elements will be given the same reference numerals, and descriptions thereof will be omitted.

Although in the first embodiment, the light-emitting surfaces 89*a* of the light-emitting elements 89 are in positions that are further from the light-guiding plate 80 than the end portion 884 of the light source substrate 88 located toward the light-guiding plate 80, in this embodiment, the light-emitting surfaces 89*a* of the light-emitting elements 89 are in positions closer to the light-guiding plate 80 than the end portion 884 of the light source substrate 88 located toward the light-guiding plate 80, as shown in FIG. 6. Therefore, according to this embodiment, the distance between the light entry portion 80*a* of the light-guiding plate 80 and the light-emitting elements 89 can be set to be lower than the distance between the light entry portion 80*a* and the light source substrate 88.

Fourth Embodiment

Figure 7:
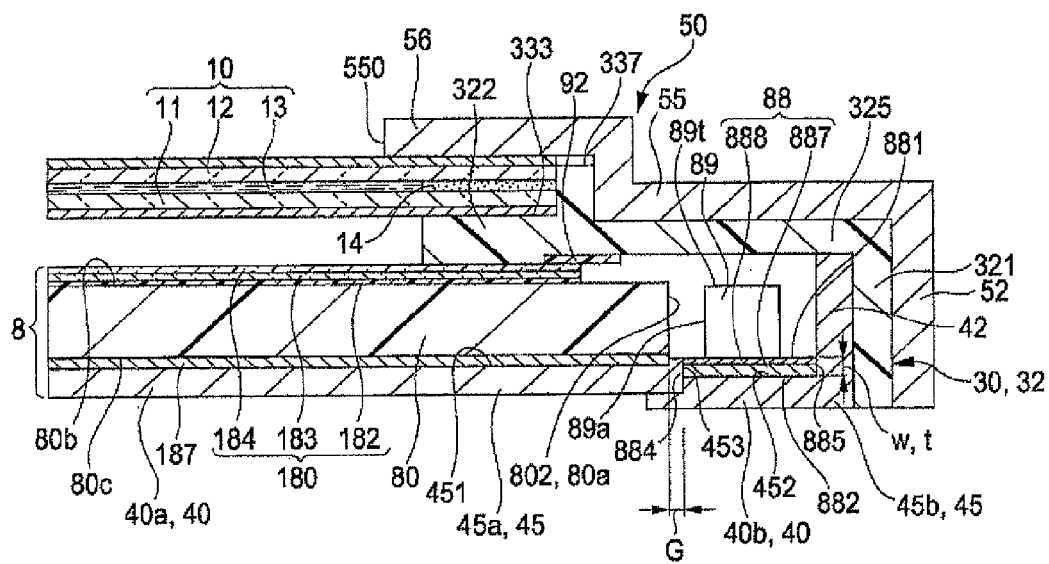
FIG. 7 is a cross-sectional view showing a liquid-crystal display apparatus according to a fourth embodiment of the invention along the VII-VII line in FIG. 1A.

FIG. 7 is a cross-sectional view showing a liquid-crystal display apparatus 100 according to a fourth embodiment of the invention along the VII-VII line in FIG. 1A. Note that the basic configuration in this embodiment is the same as that in the first embodiment, and thus corresponding constituent elements will be given the same reference numerals, and descriptions thereof will be omitted.

Although in the first, second, and third embodiments, the light-guiding plate support portion 451, the substrate support portion 452, and the step portion 453 are provided in the base plate portion 45 of the first frame 40, in this embodiment, the first frame 40 is configured of an inner-side first frame member 40*a* (frame) and an outer-side second frame member 40*b* (frame), as shown in FIG. 7. For this reason, the base plate portion 45 of the first frame 40 is configured of a base plate portion 45*a* of the first frame member 40*a* and a base plate portion 45*b* of the second frame member 40*b*. Accordingly, the light-guiding plate support portion 451 is formed in the base plate portion 45*a* of the first frame member 40*a* and the substrate support portion 452 is formed in the base plate portion 45*b* of the second frame member 40*b*. In addition, the side plate portion 42 and so on are formed in the second frame member 40*b*.

Here, the base plate portion 45*a* of the first frame member 40*a* and the base plate portion 45*b* of the second frame member 40*b* partially overlap in the direction in which light is emitted from the light-guiding plate 80 when viewed from above, and in this embodiment, an end portion of the base plate portion 45*a* of the first frame member 40*a* and an end portion of the base plate portion 45*b* of the second frame member 40*b* overlap and make contact on the other side Z2 in the Z-axis direction (the direction in which light is emitted from the light-guiding plate 80; see FIGS. 2A and 2B and so on). Accordingly, the base plate portion 45*a* of the first frame member 40*a* and the base plate portion 45*b* of the second frame member 40*b* are positioned in a highly precise manner relative to each other in the Z-axis direction, and thus the light-emitting elements 89 can be set so as to have high positions in the Z-axis direction relative to the light-guiding plate 80 even in the case where the first frame 40 is formed of two frames (the first frame member 40*a* and the second frame member 40*b*).

In addition, because the end portion of the base plate portion 45*a* of the first frame member 40*a* overlaps and makes contact with the base plate portion 45*b* of the second frame member 40*b* on the other side Z2 in the Z-axis direction (the direction in which light is emitted from the light-guiding plate 80; see FIGS. 2A and 2B and so on), the step portion 453, with which the end portion 884 of the light source substrate 88 located toward the light-guiding plate 80 makes contact, is formed by the end portion of the base plate portion 45*a* of the first frame member 40*a*.

Variation on Fourth Embodiment

Although the step portion 453 is formed using the end portion of the base plate portion 45*a* of the first frame member 40*a* in the stated fourth embodiment, the step portion 453 may be formed in the first frame member 40*a* by partially bending the end portion of the base plate portion 45*a* in which the light-guiding plate support portion 451 is formed. Likewise, the step portion 453 may be formed in the second frame member 40*b* by partially bending the end portion of the base plate portion 45*b* in which the substrate support portion 452 is formed.

Other Embodiments

Although the aforementioned first through fourth embodiments describe both the side-end surface 801 side of the light-guiding plate 80 and the side-end surface 802 side of the light-guiding plate 80 as the light entry portions 80*a*, the invention may also be applied in a liquid-crystal display apparatus 100 in which only one of the side-end surfaces 801 and 802 serves as the light entry portion 80*a*.

Furthermore, although the illumination apparatus 8 is used as a backlight apparatus for the liquid-crystal display apparatus 100 in the aforementioned embodiments, the illumination apparatus 8 may also be used as a backlight apparatus for various types of signage and the like.

Example of Installation in Electronic Device

Although the aforementioned embodiments describe an LCD television as an example of the electronic device 2000 in which the liquid-crystal display apparatus 100 is installed, the liquid-crystal display apparatus 100 in which the invention is applied may also be used in the display units of electronic devices such as personal computer displays, digital signs, car navigation devices, and mobile information terminals, in addition to LCD televisions.

The entire disclosure of Japanese Patent Application No. 2011-178256, filed Aug. 17, 2011 is expressly incorporated by reference herein.

What is claimed is:

1. An illumination device comprising:
   a light-guiding member;
   a plurality of light-emitting elements disposed along a side-end surface of the light-guiding member that serves as a light-entry portion, each of the plurality of light-emitting elements has a light-emitting surface which faces toward the light-entry portion;
   a light source substrate, disposed and separated with a space from the light-entry portion of the light-guiding member when viewed from above that includes a mounting surface for the plurality of light-emitting elements, the mounting surface being orthogonal to the side-end surface serving as the light-entry portion; and
   a frame having a base plate portion on a side of the light-guiding member that is opposite to the direction in which a light is emitted from the light-guiding member,
   the frame forming a step portion with which an end portion of the light source substrate located toward the light-guiding member makes contact, the step portion positioned between the light-entry portion of the light-guiding member and the light-emitting surface when viewed from above.

2. The illumination device according to claim 1, further comprising:
   a light-reflecting member being positioned between the light-guiding member and the frame,
   wherein the step portion overlaps with a side end of the light-reflecting member.

3. The illumination device according to claim 1, further comprising:
   a light-reflecting member being positioned between the light-guiding member and the frame,
   wherein the step attaches to a side end of the light-reflecting member.

4. The illumination apparatus according to claim 1,
   wherein an end portion of each of the plurality of the light-emitting elements on an opposite side as the light source substrate is positioned lower than a light emission surface of the light-guiding member.

5. The illumination apparatus according to claim 1,
   wherein a depth dimension of the step portion is equal to a thickness dimension of the light source substrate.

6. The illumination apparatus according to claim 1,
   wherein a depth dimension of the step portion is smaller than a thickness dimension of the light source substrate.

7. The illumination apparatus according to claim 1,
   wherein the light-emitting surface of each of the plurality of the light-emitting elements is located closer toward the light-guiding member than the end portion of the light source substrate that is located toward the light-guiding member.

8. A electro-optical apparatus provided with the illumination device according to claim 1, the electro-optical apparatus comprising:
   a liquid-crystal panel disposed overlapping a light-emitting portion of the light-guiding member.

9. An electronic device comprising the electro-optical apparatus according to claim 8.

* * * * *